United States Patent [19]

Ewer

[11] Patent Number: 5,597,058
[45] Date of Patent: Jan. 28, 1997

[54] HUB LOCK FOR VEHICLE

[76] Inventor: Fred L. Ewer, 8448 SE. Jannsen Rd., Clackamas, Oreg. 97015

[21] Appl. No.: 390,538

[22] Filed: Feb. 17, 1995

Related U.S. Application Data

[63] Continuation-in-part of Ser. No. 234,681, Apr. 28, 1994, Pat. No. 5,520,272.

[51] Int. Cl.$^6$ ............................. F16D 1/06; F16D 11/04; F16D 43/02
[52] U.S. Cl. .................... 192/69.43; 192/54.2; 192/54.5; 180/247; 403/1
[58] Field of Search ............................. 192/69.4, 69.43, 192/54.2, 54.5, 36; 180/233, 247; 403/1

[56] References Cited

U.S. PATENT DOCUMENTS

| | | |
|---|---|---|
| 3,442,361 | 5/1969 | Hegar . |
| 4,223,772 | 9/1980 | Telford . |
| 4,266,646 | 5/1981 | Telford . |
| 4,327,821 | 5/1982 | Telford . |
| 4,438,836 | 3/1984 | Kagata . |
| 4,811,824 | 3/1989 | Kurihara . |
| 4,854,434 | 8/1989 | Kurihara . |

FOREIGN PATENT DOCUMENTS 198527  9/1987  Japan ...................................... 192/95

Primary Examiner—Charles A. Marmor
Assistant Examiner—Saul Rodriguez
Attorney, Agent, or Firm— Klarquist Sparkman Campbell Leigh & Whinston, LLP

[57] ABSTRACT

A hub lock for a vehicle having a hub lock housing assembly that is pre-assembled and then assembled as a unit to the vehicle's axle, spindle and wheel hub. The sub-assembly arrangement is provided by splitting the functions of the vehicle's drive gear mounted on the end of the vehicle's axle. An inner drive gear member (also referred to as a sleeve or spacer) is mounted to the axle end to secure the axle on the spindle. An outer drive gear that slidably fits onto the inner drive gear provides the direct connection to the clutch ring of the hub lock. The inner drive gear is pre-assembled to the axle and the outer drive gear enables the hub lock housing assembly to be pre-assembled and as a unit to slidingly mount onto the vehicle. A dial used to manually retract the clutch ring into engagement against spring resistance is provided with a spring assist that is spring loaded when the dial is rotated to the disengaged position.

10 Claims, 5 Drawing Sheets

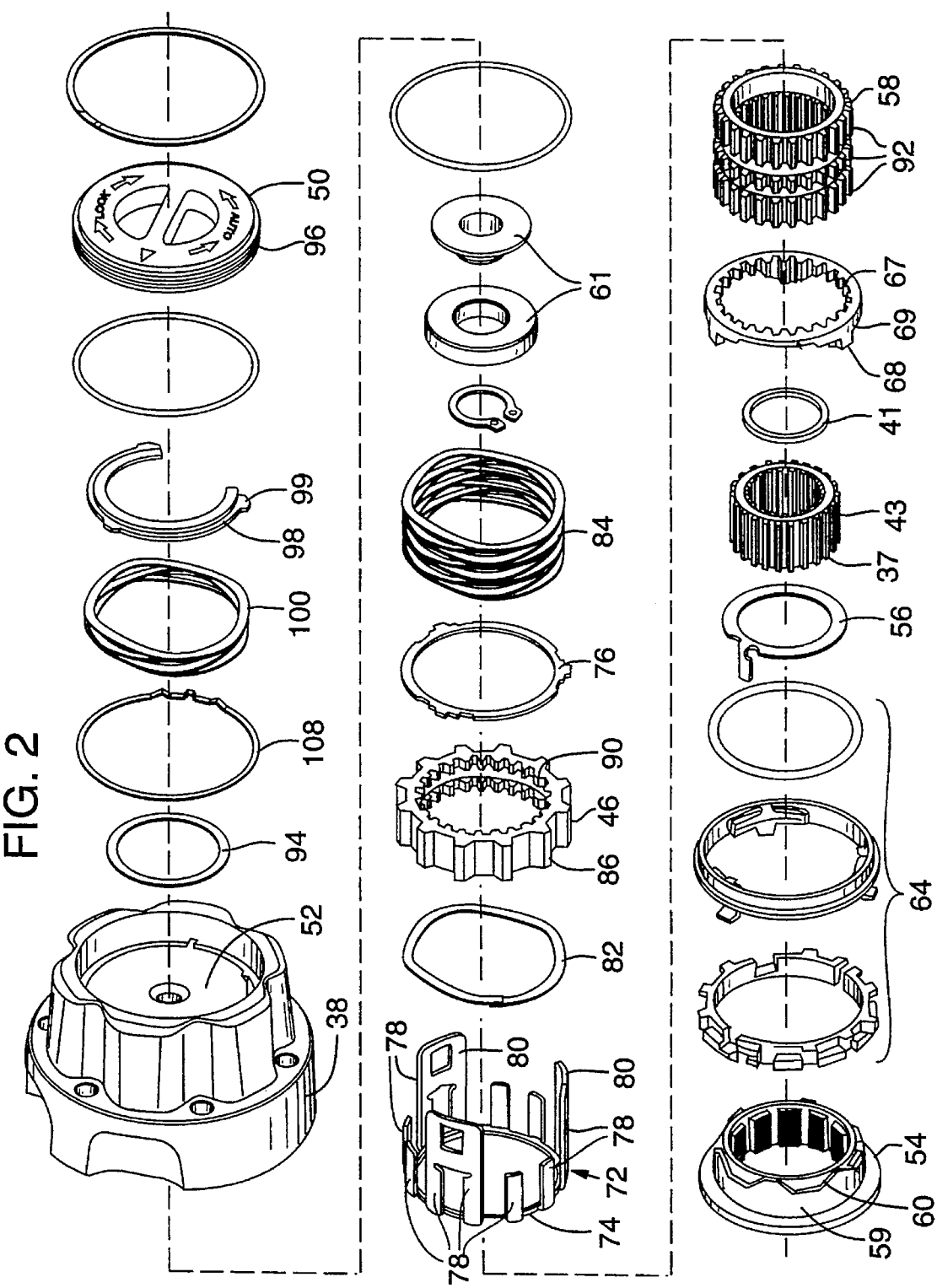

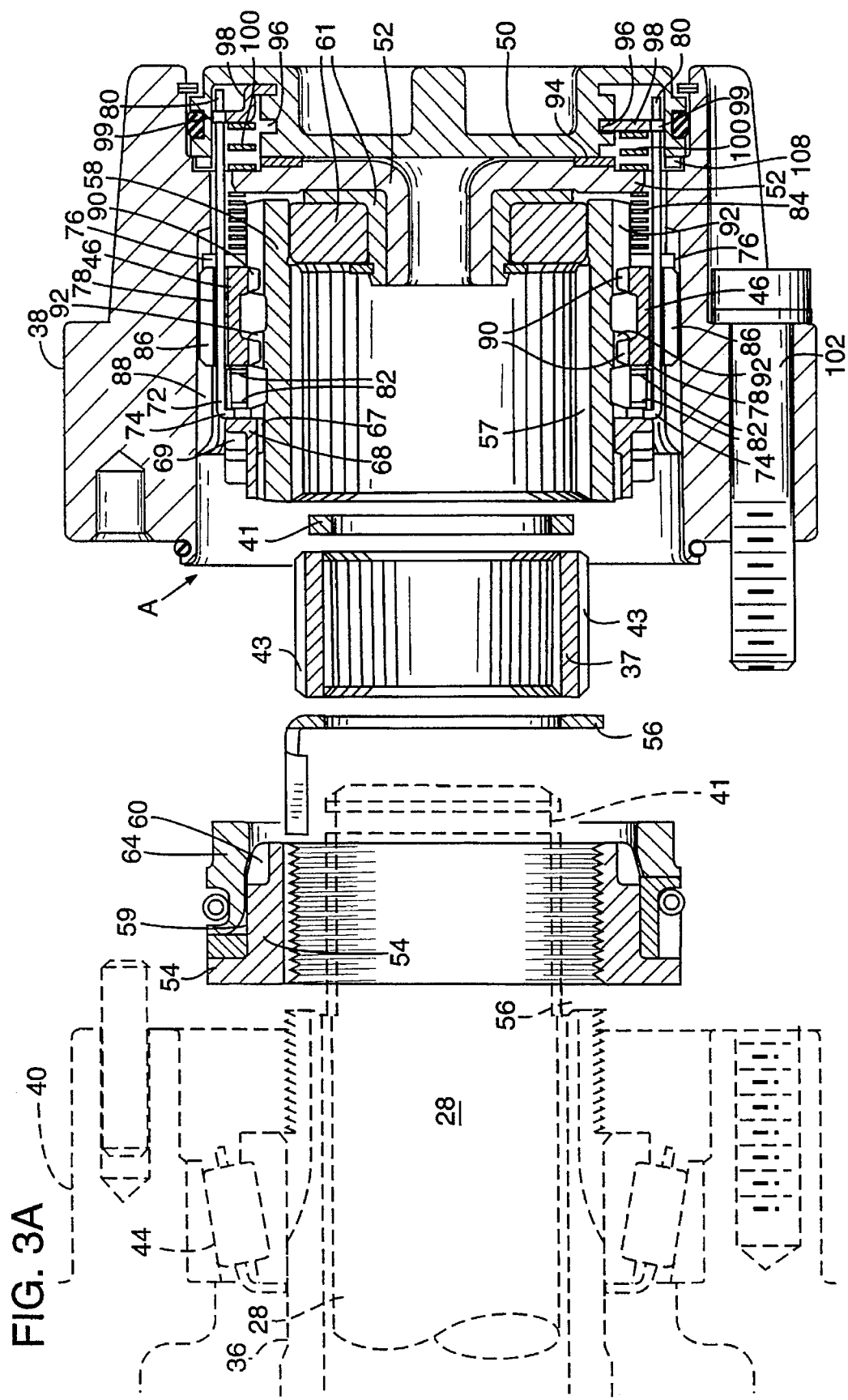

HUB LOCK FOR VEHICLE

This application is a continuation-in-part of U.S. Ser. No. 08/234,681, filed Apr. 28, 1994, now U.S. Pat. No. 5,520,272.

FIELD OF THE INVENTION

This invention relates to an automatic hub lock with manual override wherein the hub lock design is adapted to accommodate easier assembly and the manual override is assisted, now U.S. Pat. No. 5,520,272.

BACKGROUND OF THE INVENTION

The disclosure of U.S. Ser. No. 08/234,681 is incorporated herein in its entirety. In that device, an automatic hub lock with manual override is provided for an existing spindle and axle. The axle is inserted through the cylindrical spindle. A drive gear is spline fit to the axle end which is protruded through the spindle and a lock ring secures the drive gear to the axle end. The drive gear's abutment to the spindle restricts movement of the axle back through the spindle. The drive gear includes exterior teeth or splines for engagement by a clutch ring that is also spline fit to the wheel hub. Engagement of the clutch ring to both the drive gear and wheel hub interlocks the wheel and axle in four-wheel drive.

There are numerous other components that must be assembled to the clutch ring and wheel hub, and these components are in large part assembled sequentially and in a time consuming manner. It is an objective of this invention to provide a hub lock assembly that can be largely pre-assembled and then mounted as a unit to the vehicle's axle, spindle and wheel hub.

A second part of the invention concerns the manual override. When manual locking is desired, a dial is rotated by hand. The dial is connected to a spring biased cage that carries the clutch ring. The spring strongly urges the clutch ring to a disconnected condition and turning of the dial to the interlock condition is thus strongly resisted and may be difficult for an operator to accomplish. It is accordingly a second objective of this invention to provide an assist to the operator for rotating the dial to the interlock position.

BRIEF DESCRIPTION OF THE PREFERRED EMBODIMENT OF THE INVENTION

Pre-assembly is largely accomplished by splitting the functions of the drive gear and thereby providing two drive gears. (The terms are not intended to be limiting. The components may be referred to as a sleeve or spacer and drive gear rather than inner and outer drive gears as used throughout this disclosure.) An inner drive gear is provided on the end of the axle and functions to confine or restrict movement of the axle. The inner drive gear has exterior splines or teeth and an outer drive gear having mated internal splines is mounted to the inner drive gear. Whereas the inner drive gear is necessarily locked onto the axle, the outer drive gear is free to slide on and off the inner drive gear. Certain cam actuator components are also mounted to the spindle and the remainder of the components including outer drive gear, clutch ring, cage, cam follower, springs and dial mechanism can all be pre-assembled onto the hub lock housing and assembled as a unit onto the axle, spindle and wheel hub. The provision of the outer drive gear is a major factor for enabling pre-assembly of these components.

The dial includes a threaded shaft. A nut-like member (nut) threadably engaged with the shaft and prevented from turning is moved in and out relative to the hub lock housing by turning the dial. The nut engages the cage (which carries the clutch ring) and upon outward movement of the nut (through turning of the dial) produces locking engagement of the clutch ring. Movement of the nut is resisted by a strong spring. A second spring positioned between the hub lock housing and the nut urges the nut to its outer position and thus counters the resistance of the strong spring. Inward movement of the nut requires compressive loading of the second spring but it is a weaker spring and there is no other resistance to this inward movement. The operator is thus provided with a trade off. Disconnect turning is made somewhat more difficult but the net effect is that neither direction of turning is overly difficult for the operator.

The invention will be more clearly understood and appreciated with reference to the following detailed description and the drawings referred to therein.

DESCRIPTION OF THE DRAWINGS

FIG. 2 is an exploded view illustrating the components of the preferred embodiment of the present invention;

FIGS. 3A and 3B are section views of the assembled components of FIG. 2 as if taken on view lines 3—3 of FIG. 1, with FIG. 3A illustrating the pre-assembled hub lock components separated from the vehicle's axle, spline and wheel hub, and FIG. 3B illustrating the hub lock components fully assembled onto the vehicle's axle, spindle and wheel hub.

DETAILED DESCRIPTION

Figure 1:
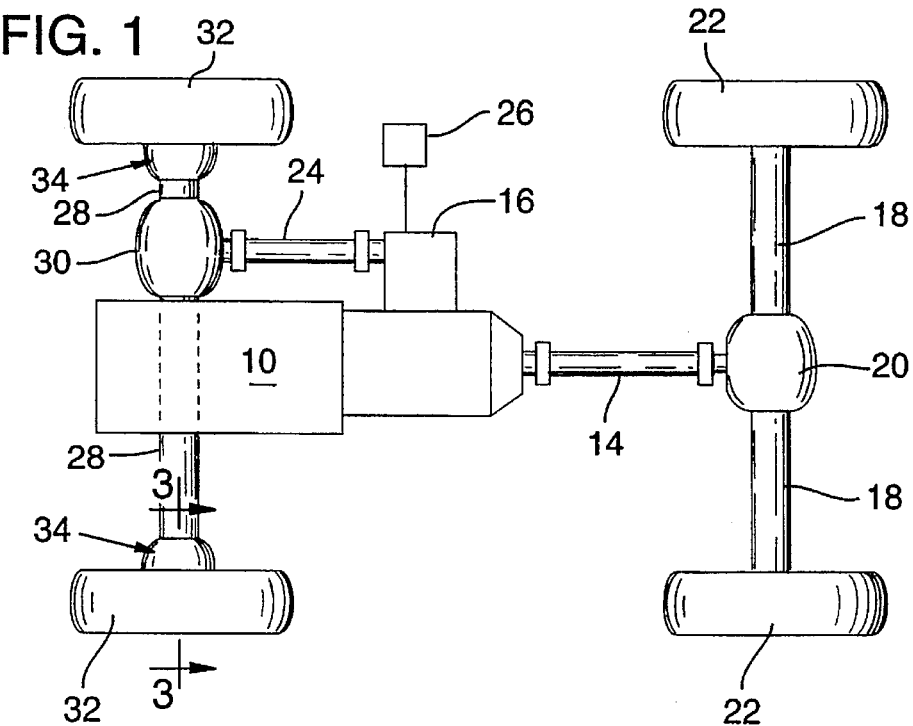
FIG. 1 is a schematic illustration of a vehicle drive line.

With reference to FIG. 1, a vehicle drive line as contemplated herein includes an engine 10 which drives a rear propeller shaft 14 connected to rear wheel axles 18 through a rear differential 20 to drive rear wheels 22. A transfer case 16 connects/disconnects engine 10 to a front propeller shaft 24 connected to front axles 28 through differential 30 to selectively drive front wheels 32. Control 26 which controls engagement of the front propeller shaft in the transfer case 16 is activated by the operator to selectively power rotation of the front propeller shaft 24 and axles 28.

When it is desired to drive in two-wheel drive, control 26 is activated to disconnect propeller shaft 24 from the engine 10. In such a case, it is desirable to disconnect the front wheels 32 from axles 28. Otherwise the front wheels being connected to the axles 28 will cause rotation of the axles, propeller shaft 24 and related components to unnecessarily affect wear and power loss. A hub lock 34 provided in each of the front wheels produces the desired disconnection when the propeller shaft 24 is disconnected from the engine for two-wheel drive and produces the desired connection when four-wheel drive is selected.

Figure 1A:
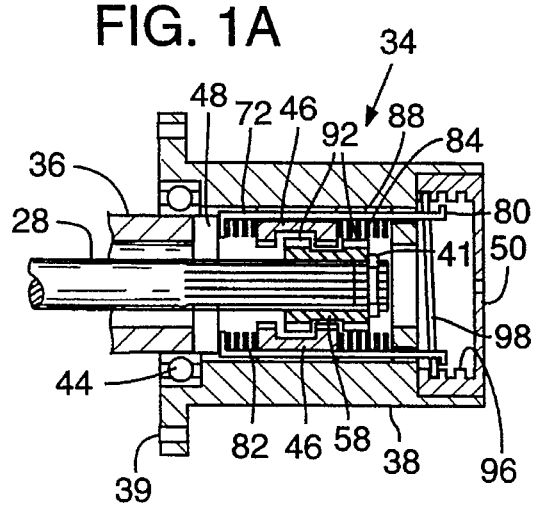
FIG. 1A is a schematic illustration of a hub clutch such as incorporated into the drive line of FIG. 1.

FIG. 1A schematically illustrates a hub lock 34 having an automatic connect/disconnect arrangement for the front wheels as contemplated for the present invention. The illustration is intended only to convey an understanding of how the interlock system works. Item 38 is a hub lock housing and is designed to be bolted (via bolt holes 39) to a wheel hub. Thus, the wheel hub and hub lock housing are fixed together. Item 36 is a fixed or dead spindle. The hub lock housing 38 (and wheel hub) rotates around the dead spindle 36 via bearings 44. Axle 28 rotates inside the dead spindle 36 and its bearings are not shown. Item 46 is a clutch ring and includes exterior teeth splined to the interior teeth 88 of the housing. The clutch ring is captured within a cage 72 whose function will be described in more detail hereafter.

The axle is provided with a drive gear (rotatively fixed to the axle) which has spaced teeth 92 that are engaged or disengaged from interior teeth on the clutch ring 46. As shown, the teeth of clutch ring 46 are disengaged from teeth 92 projected from the drive gear. By moving the clutch ring 46 to the right as shown in FIG. 1A, the teeth of clutch ring 46 will become engaged with drive gear teeth 92 and the axle and the hub lock housing 38 (and thus the wheel hub) will be interlocked.

Movement of the clutch ring occurs either manually or automatically. The automatic movement is achieved by a cam mechanism which is represented by member 48. A fixed cam surface on the dead spindle 36 engages a cam surface (not shown) on member 48. Member 48 is splined to the axle and moves axially but is fixed rotatively to the axle. Upon rotation of axle 28 (initiated by control 26), the cam surfaces on fixed spindle 36 and rotating member 48 separate and thereby forces member 48 to move axially against cage 72 which compresses a spring 82 against clutch ring 46 which urges the clutch ring teeth into engagement with the drive gear teeth 92. Termination of the rotational drive of the axle 28 allows the cam faces to reseat and spring 84 urges the clutch ring to its disengaged position. (Note that spring 82 is stronger than spring 84.)

The manual movement of the clutch ring is achieved by turning dial 50. A nut-like member 98 is moved outwardly on threads 96 of dial 50. End 80 of cage 72 is configured to be engaged by the nut 98 and draws the cage 72 outwardly with it.

Figure 4:
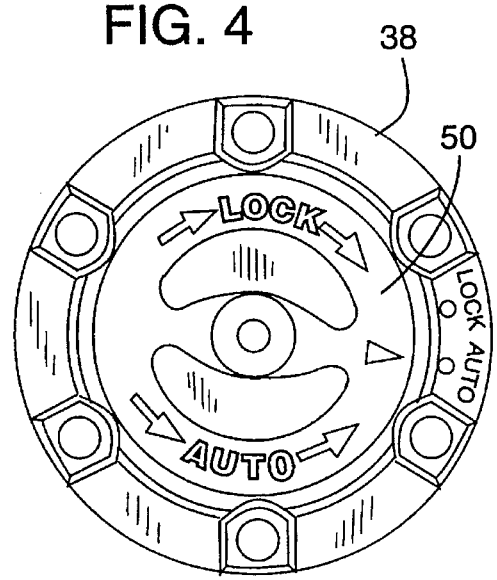
FIG. 4 is an end view of a hub lock illustrating the dial mounted in the face of the hub lock and FIGS. 4A, 4B and 4C illustrate the retention mechanism for retaining the dial in either of its manual or auto lock positions.

The above description is general in nature and the invention will now be described in more detail with reference to FIGS. 2–4. As will be observed from the dash line illustration of axle 28 in FIGS. 3A and 3B, axle 28 has a diameter that enables it to slide through the spindle 36. Typically a drive gear is mounted on the protruded end of the axle. In the present case, a spacer gear or inner drive gear 37 is mounted on the protruded end of the axle and a lock washer 41 secures the inner gear 37 to the end of the axle. The inner gear is larger than the opening through the spindle and restricts retraction of the axle 28.

A spindle nut 54 is screwed onto the spindle 36 and is secured in place by a lock ring 56 which also serves as a thrust washer for the inner drive gear 37. The primary function of the spindle nut is to secure the bearing 44 around which the wheel hub rotates. The spindle nut is also configured to have a circumferential brake surface 59 and cam surfaces 60. Surrounding the brake surface 59 is a brake member 64 that resistively rotates around the brake surface 59 of the spindle. The cam surfaces 60 as will be explained is part of the cam mechanism that produces automatic clutch ring engagement.

The components as disclosed above are readily assembled to the spindle and axle of the vehicle as shown in FIG. 3A. Also shown in FIG. 3A separated from the spindle and axle is a pre-assembled hub lock housing assembly indicated generally by letter A.

The hub lock housing assembly includes the hub lock housing 38 provided with internal splines or teeth 88. The clutch ring 46 has external splines 86 that slidingly engage splines 88 of the housing. The clutch ring has spaced sets of internal teeth or splines 90. An outer drive gear 58 has spaced sets of external teeth or splines 92 mated to teeth 90 of the clutch ring. FIG. 3A shows teeth sets 90 and 92 engaged and FIG. 3B shows the teeth sets 90 and 92 disengaged. The teeth sets may be considered as rows of teeth and reference is made to FIG. 2 for a better understanding of this configuration. With the clutch ring forced to its outer axial position the teeth are engaged (FIG. 3A), and in the inner axial position the rows are out of alignment and thus disengaged (FIG. 3B).

Figure 3B:
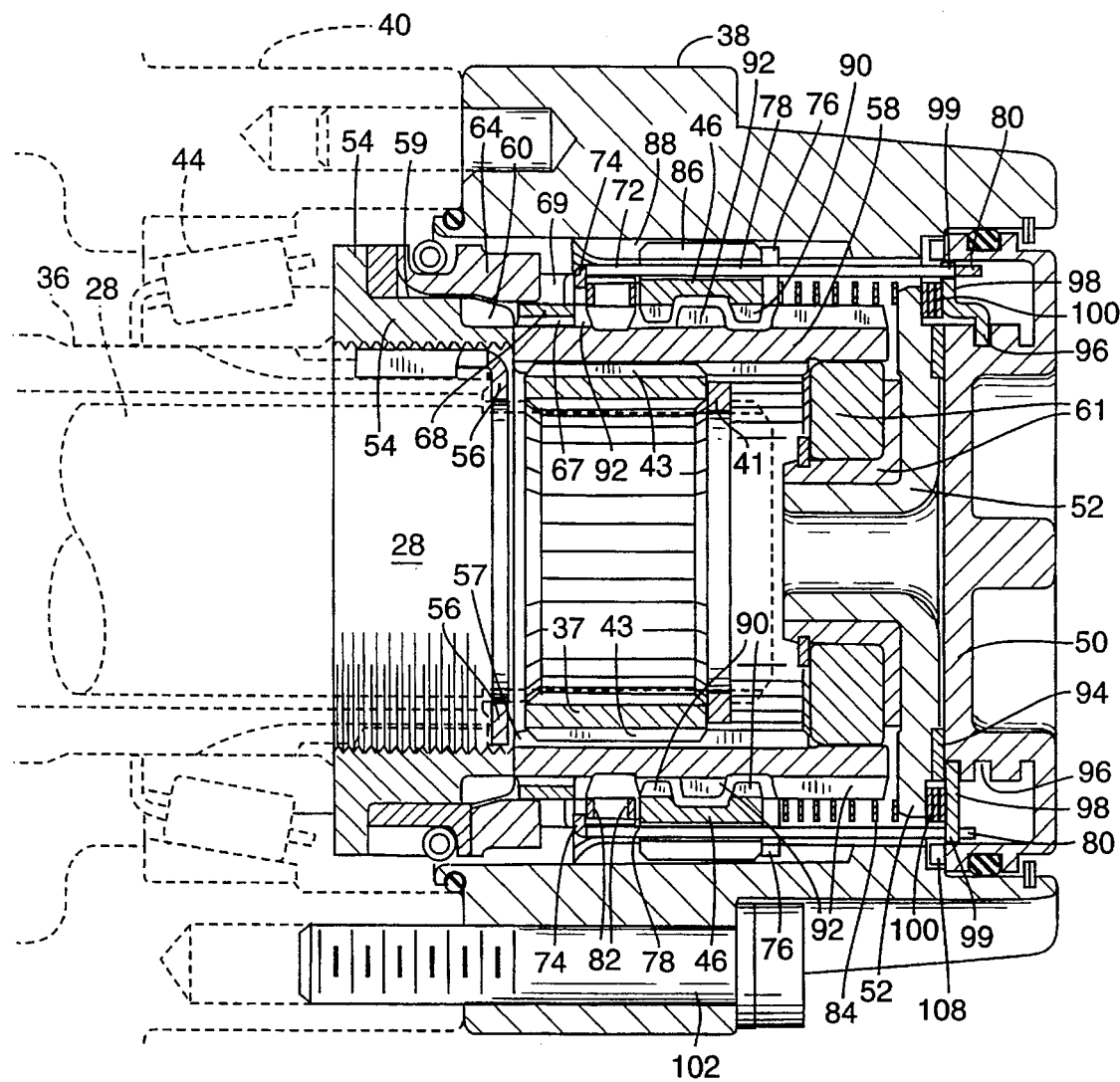

As will be noted from FIG. 3B, the outer drive gear 58 has internal splines 57 which mate with the exterior splines 43 of the inner drive gear 37. The outer drive gear at its axially outer end is rotatively mounted to a hub lock housing end portion 52 by bearing members 61.

The clutch ring 46 is captured between end walls 74 and 76 of a cage 72. The cage has bars 78 (see FIG. 2) and certain of the bars have extensions 80 formed into loops or hook-shaped ends that extend outwardly to the dial 50 as shown. At the inner side of the cage abutting end 74 is a cam follower 68 having cam faces 69. The cam follower 68 includes splines 67 that slidingly engage with the splines 92 at the axially inner end of the outer drive gear 58. Inside the cage 72 between clutch ring 46 and cage end 74 is a strong spring 82. A weaker spring 84 is positioned between cage end 76 and the housing end portion 52. Positioned outside the housing end portion 52 is the dial 50 having screw threads 96. The dial 50 turns relative to the hub lock housing (38, 52) and thrust washer 94 facilitates such turning. As noted, nut member 98 is engaged in the screw threads 96 and extensions 99 of the nut 98 project through the configured loop end portions 80 of the cage 72. Positioned between the housing portion 52 and the nut 98 is an assist spring 100.

FIG. 3B illustrates the hub lock housing assembly mounted to the spindle 36, wheel hub 40 and axle 28 (and the components assembled thereto as explained above). As noted, the splines of the inner and outer drive gears are aligned and as the hub lock assembly is slid into place, the cam surfaces of spindle nut 54 and brake member 64 are brought into alignment with the cam surfaces of cam follower 68. Bolt holes in the hub lock housing and the wheel hub are aligned and the bolts 102 secure the sub-assembly in place relative to the axle, spindle and wheel hub.

The reader upon reference to the co-pending application, Ser. No. 08/234,681, will note many similarities in construction. The improvements particularly to be noted are the change in the drive gear configuration, i.e., the present invention includes inner and outer drive gears (37, 58), and the assist for manual engagement, i.e., the inclusion of the thrust washer 94 and spring assist 100. The assist improvements for the manual override are further explained in the following operations section.

Typically the manual override will be inactive and the dial will be turned to its counter clockwise position with the nut 98 positioned inwardly as shown in FIG. 3B. As seen in FIG. 2, the looped configuration of end portions 80 allows the cage 72 the freedom to move in and out without interference by the nut extensions 99 which protrudes through the loops.

With control 26 disengaged (positioned in two-wheel drive mode), the spring 84 urges the cage end wall 76 and thus the clutch ring 46 to its disengaged position (FIG. 3B). When axle 28 is caused to rotate due to engagement at the transfer case by control 26, the cam follower 68, due to its engagement with cam surfaces 60 on the spindle nut 54, is forced axially outwardly which forces the cage end wall 72 against spring 82 and ultimately engagement of the clutch ring 46 with outer drive gear 58 as seen in FIG. 3A.

Manual override is achieved by turning the dial 50 to position the nut 98 to its outer axial position as seen in FIG. 3A. Consider that the automatic actuator is in a disengaged position. Movement of the nut to the outer position causes the extension 99 of the nut 98 to engage the top or hook end of the extension 80 and draws the cage against the urging of spring 84, i.e., it achieves the same action as the cam action generated by the cam follower described in the previous paragraph. Particularly if the splines, the drive gear and clutch ring are not aligned so that such movement requires collapsing of the strong spring, such turning of the dial requires significant force. An operator may be able to provide this force only with much difficulty and the assist spring 100 is provided to make that task easier. That is, it urges the nut to its outer axial position as will be apparent by comparing the collapsed spring 100 in FIG. 3B with the expanded spring 200 in FIG. 3A.

Figure 4A:
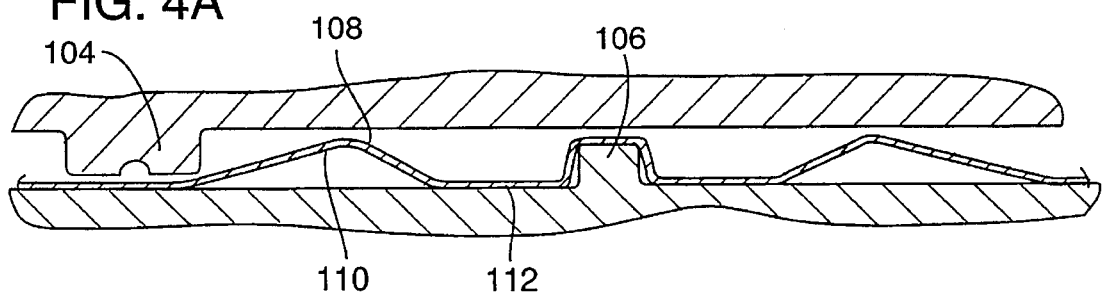
Figure 4B:
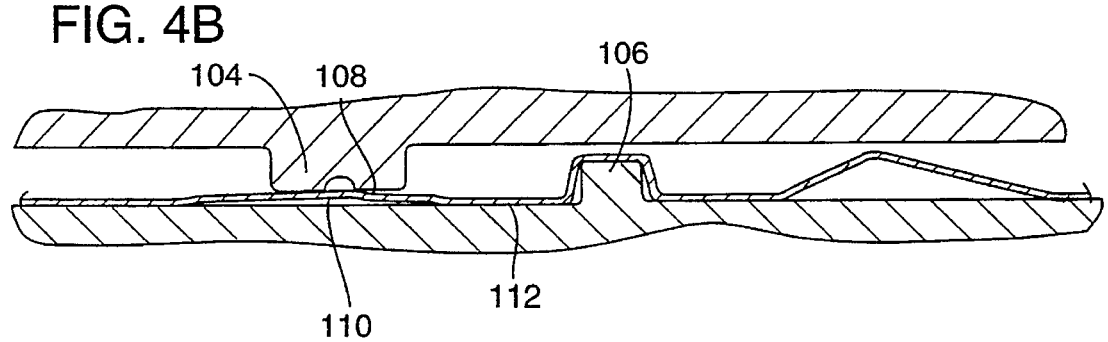
Figure 4C:
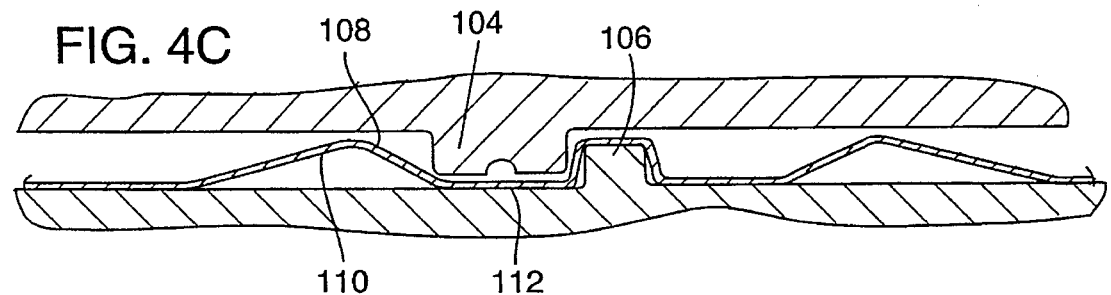

FIGS. 4A, 4B and 4C illustrate the retention mechanism for the dial. Between the dial and the hub lock housing are stop lugs 104, 106, respectively. The lugs are engaged at one side when the dial is rotated to position the nut 98 to its full inner position ("AUTO") and engaged at the other side when the dial is rotated to position the nut 98 to its full outer position ("LOCK"). A configured spring 108 is provided on each side of lug 106. As lug 104 approaches lug 106, it encounters a bulge portion 110 of the spring as seen in FIG. 4A. FIG. 4B shows the bulge portion being flattened and FIG. 4C shows the lug 104 having passed over the bulge portion 110 and resides in recessed portion 112. Reverse turning of the dial is resisted by the bulge portion at either extreme position of the dial.

Those skilled in the art may conceive of numerous variations and modifications to the illustrated embodiment without departing from the scope of the invention which is indicated in the claims appended hereto.

I claim:

1. A hub lock interconnection between an axle and a wheel hub of a vehicle comprising:

an axle, a wheel hub and a movable clutch ring having first and second positions, a first position locking wheel hub to the axle and a second position unlocking the wheel hub from the axle;

a cylindrical spindle, said axle having an exterior end projected through the spindle, and an inner drive gear coupled to the exterior end and restricting withdrawal of the axle inwardly through the spindle, and an outer drive gear slidably spline fit to the exterior of the inner drive gear;

said outer drive gear having exterior splines and said clutch ring slidably spline fit to the exterior splines of the outer drive gear for producing connection between the clutch ring and axle.

2. A hub lock interconnection as defined in claim 1 including a hub lock housing, said hub lock housing fixedly attachable to the wheel hub, an interior wall in said housing and splines provided on said interior wall, said outer drive gear further having interior splines, said interior splines spline fit to the inner drive gear and the clutch ring having exterior splines spline fit to the interior wall in said housing, said hub lock housing, said outer drive gear and said clutch ring providing a sub-assembly unit independent of the axle, spindle and wheel hub, said sub-assembly mountable as a unit to the axle, spindle and wheel hub of the vehicle.

3. A hub lock interconnection as defined in claim 2 wherein the clutch ring is moved into the first position by a camming mechanism including a cam actuator fixedly mounted to a spindle nut that is pre-assembled onto the spindle, and a cam follower mounted to the outer drive gear and a part of the sub-assembly unit.

4. A hub lock interconnection as defined in claim 3 including:

a cage comprising end portions and interconnecting bars, said clutch ring positioned between the end portions and a first spring between an end portion and the clutch ring urging the clutch ring toward the other end portion, said cam follower in response to said camming mechanism acting against said first end portion and urging the end portion against the first spring for urging the clutch ring to the first position; and a second spring weaker than said first spring acting between said hub lock housing and said other end portion of the cage to urge the clutch ring to the second position in absence of said camming mechanism, said cage and first and second springs forming part of the sub-assembly to be mounted as a unit to the axle, spindle and wheel hub of the vehicle.

5. A hub lock interconnection as defined in claim 4 wherein certain of the bars of the cage are extended axially to the outer end of the hub lock housing, a dial rotatably mounted in said hub lock housing end and a nut mounted to said dial and movable axially between inner and outer positions by rotation of the dial, said extended bars engageable by said nut for axial movement of the cage to the outer position and thereby urging the clutch ring to the first position.

6. A hub lock interconnection as defined in claim 5 wherein said extended bars are formed into elongated loops and finger portions of the nut are extended through the loops, said loops providing movement of the cage relative to the nut with the nut axially positioned at the inner position.

7. A hub lock interconnection as defined in claim 6 wherein a third spring is positioned between the hub lock housing portion and the nut for urging the nut to the outer position and thereby assist rotative movement of the dial for urging the clutch ring to the first position.

8. A hub lock interconnection as defined in claim 7 wherein a thrust bearing is positioned between the dial and the hub lock housing to assist rotation of the dial relative to the housing.

9. A hub lock interconnection between an axle and a wheel hub of a vehicle comprising:

an axle, a wheel hub and a movable clutch ring having first and second positions, said first position locking the wheel hub to the axle and said second position unlocking the wheel hub from the axle;

a hub lock housing enclosing the clutch ring and affixed to the wheel hub, a dial in the housing exposed for manual clockwise and counter clockwise turning, a linkage between the dial and the clutch ring and responsive to one of the turning directions of the dial to urge the clutch ring to one of the first and second positions, a first spring having a first spring strength urging the clutch ring to the other of the first and second positions, a second spring urging said clutch ring in a direction opposite said first spring and having a second spring strength different from said first strength, and a third spring assisting turning of the dial in said one of the turning directions.

10. A hub lock interconnection between an axle and a wheel hub of a vehicle comprising:

an axle, a wheel hub and a movable clutch ring having first and second positions, said first position locking the wheel hub to the axle and said second position unlocking the wheel hub from the axle;

a hub lock housing enclosing the clutch ring and affixed to the wheel hub, a dial in the housing exposed for manual clockwise and counter clockwise turning, a linkage between the dial and the clutch ring and responsive to one of the turning directions of the dial to urge the clutch ring to one of the first and second positions, a first spring urging the clutch ring to the other of the first add second positions, and a second spring assisting turning of the dial in said one of the turning directions, and wherein an outstanding lug on the housing and a depending lug on the dial are brought into abutment when the dial is rotated to its two extreme positions, a formed spring provided on one of the dial and housing adjacent the lug thereon, said formed spring having a bulge portion and a recessed portion, said bulge portion engaged by the other of said lugs and resisting but not preventing movement of said other of the lugs to the recessed portion of the formed spring whereat the dial is in one of its extreme positions and whereat reversal of the dial is resisted by the bulge portion.

* * * * *